United States Patent
Kobayashi

(10) Patent No.: US 6,347,653 B1
(45) Date of Patent: Feb. 19, 2002

(54) HEAVY DUTY PNEUMATIC TIRE INCLUDING LUG GROOVES AND SHALLOW CIRCUMFERENTIAL GROOVE

(75) Inventor: Yasuhiko Kobayashi, Hachioji (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/504,913

(22) Filed: Feb. 16, 2000

(30) Foreign Application Priority Data

Feb. 17, 1999 (JP) ............................................. 11-038267

(51) Int. Cl.⁷ .................... B60C 11/03; B60C 11/13; B60C 101/00; B60C 103/00; B60C 121/00
(52) U.S. Cl. ................ 152/209.1; 152/209.5; 152/209.13; 152/209.15; 152/209.26
(58) Field of Search ................ 152/209.1, 209.5, 152/209.12, 209.13, 209.15, 209.18, 209.26

(56) References Cited

U.S. PATENT DOCUMENTS

| | | | |
|---|---|---|---|
| 2,592,557 A | * 4/1952 | Gibbs ...................... | 152/209.12 |
| 3,739,828 A | * 6/1973 | Schaevitz .............. | 152/209.12 |
| 3,818,965 A | * 6/1974 | Newman ................ | 152/209.12 |
| 4,254,811 A | * 3/1981 | Devaux .................. | 152/209.13 |
| 4,947,911 A | * 8/1990 | Ushikubo et al. ....... | 152/209.15 |
| 5,479,973 A | * 1/1996 | Ikeda ..................... | 152/209.13 |

FOREIGN PATENT DOCUMENTS

| | | | | |
|---|---|---|---|---|
| FR | 2317112 | * 2/1977 | ............ | 152/209.15 |
| JP | 58-152610 | * 9/1983 | ............ | 152/209.13 |
| JP | 61-285105 | * 12/1986 | ............ | 152/209.13 |
| JP | 64-60405 | * 3/1989 | ............ | 152/209.13 |

* cited by examiner

*Primary Examiner*—Steven D. Maki
(74) *Attorney, Agent, or Firm*—Sughrue Mion, PLLC

(57) ABSTRACT

A heavy duty pneumatic tire comprises a tread portion, a plurality of lug grooves formed in the tread portion so as to extend from a tread end toward an equator of the tire, and a central land portion formed between two circumferential lines passing through terminal positions of these lug grooves substantially in a circumferential direction of the tire, wherein the tread portion is made of rubber having a loss tangent at room temperature of 0.04~0.40, and has a given negative ratio at a region corresponding to at least 50% of a tread width around the equator and a given maximum groove depth of the lug groove located at a zone corresponding to at least 80% of the tread width around the equator, and a circumferential shallow groove is formed in the central land portion.

4 Claims, 2 Drawing Sheets

HEAVY DUTY PNEUMATIC TIRE INCLUDING LUG GROOVES AND SHALLOW CIRCUMFERENTIAL GROOVE

BACKGROUND OF THE INVENTION

1. Field of the Invention

This invention relates to a heavy duty pneumatic tire for use in truck, bus, construction vehicle and the like, and more particularly to a heavy duty pneumatic tire capable of improving wear resistance and effectively controlling heat generation in a tread portion (particularly a central land portion) during the running of the tire under loading to prevent separation failure through heat by using rubber having specified properties in a tread rubber and rationalizing lug grooves and shape of the central land portion.

2. Description of Related Art

In the conventional heavy duty pneumatic tire for use in truck, bus, construction vehicle and the like having so-called lug pattern formed by arranging a plurality of lug grooves at given intervals, it is common to use means for increasing a tread volume, means for increasing a tread gauge (increase of groove depth), means for reducing a negative ratio, means for enhancing stiffness of land portion (e.g. decreasing pitch number of lug grooves to increase a ratio of land portion), and the like for improving the wear resistance of the tire.

When the wear resistance is improved by using the above means, however, it particularly tends to bring about the degradation of heat build-up in the tread portion during the running of the tire under loading. The degradation of heat build-up causes the occurrence of troubles such as separation failure of tread portion through heat and the like.

Lately, there is a remarkable tendency of degrading the beat build-up in the tread portion with the advance of size-enlarging, flattening and heavy-loading of the tire accompanied with the increase of the size in the construction vehicle or the like.

SUMMARY OF THE INVENTION

It is, therefore, an object of the invention to provide a heavy duty pneumatic tire capable of improving wear resistance and effectively controlling heat generation in a tread portion (particularly a central land portion) during the running of the tire under loading to prevent separation failure through heat by using rubber having specified properties in a tread rubber and rationalizing lug grooves and shape of the central land portion.

According to the invention, there is the provision of in a heavy duty pneumatic tire comprising a tread portion, a plurality of lug grooves formed in the tread portion and extending from each end of the tread portion toward an equator of the tire, and a central land portion continuously extending between two circumferential lines each formed by connecting terminal positions of these lug grooves substantially in a circumferential direction of the tire, the improvement wherein a tread rubber constituting the tread portion has a loss tangent at room temperature of 0.04~0.40, and a negative ratio at a region corresponding to at least 50% of a tread width around the equator is 10~30%, and a maximum value of a groove depth of the lug groove located at a zone corresponding to at least 80% of the tread width around the equator is not less than 60 mm, and a circumferential shallow groove extending along the circumferential direction of the tire is formed in the central land portion.

In a preferable embodiment of the invention, the circumferential shallow groove has a groove depth corresponding to not more than 25% of the maximum value of the groove depth of the lug groove and a groove width corresponding to 30~80% of a vertical distance between the two circumferential lines.

In another preferable embodiment of the invention, the tire has an aspect ratio of not more than 90%.

In the other preferable embodiment of the invention, a coefficient in correspondence with a maximum speed in the Load/Inflation Pressure Table for construction vehicle tire defined in TRA is not less than 1.4.

In a still further preferable embodiment of the invention, the tire is a tire for wheeled crane or mobile crane.

BRIEF DESCRIPTION OF THE DRAWINGS

The invention will be described with reference to the accompanying drawings, wherein:

FIG. 1b is a diagrammatically partial section view taken along a line Ib—Ib of FIG. 1a;

FIG. 2b is a diagrammatically partial section view taken along a line IIb—IIb of FIG. 2a.

DESCRIPTION OF PREFERRED EMBODIMENTS

Figure 1A:
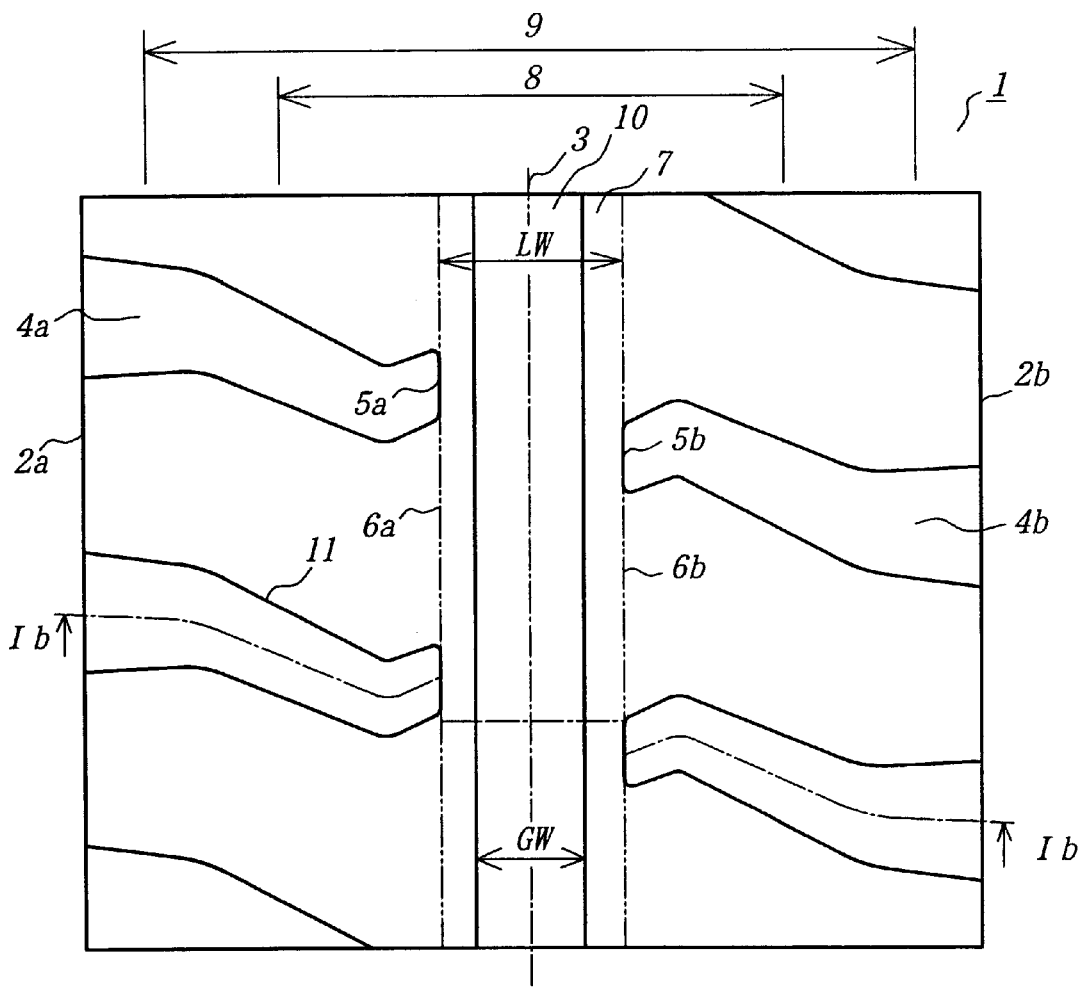
FIG. 1a is a diagrammatically developed view of an embodiment of the tread portion in the heavy duty pneumatic tire according to the invention.
Figure 1B:
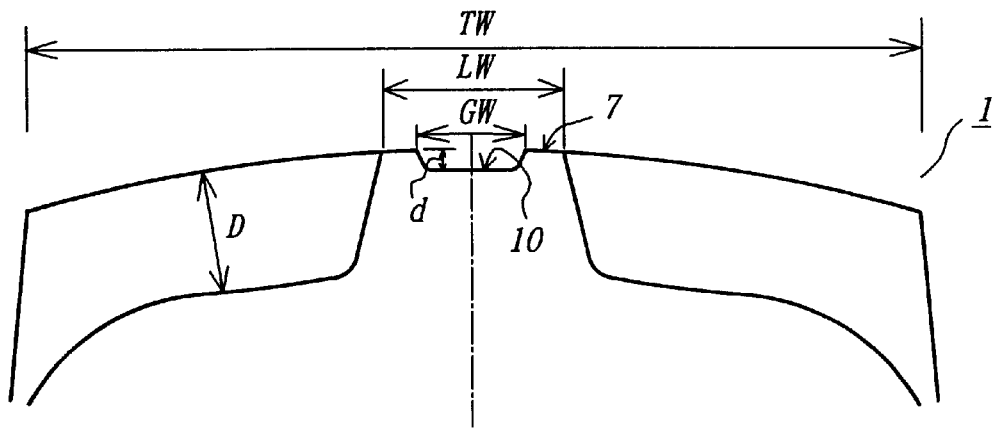

In FIG. 1a is developed a part of a tread portion in the heavy duty pneumatic tire according to the invention, and a main part of the tread portion shown in FIG. 1a is sectionally shown in FIG. 1b. Numeral 1 is a tread portion, numerals 2a and 2b tread ends, numeral 3 an equator of the tire, numerals 4a and 4b lug grooves, numerals 5a and 5b terminals of the lug grooves, numerals 6a and 6b circumferential lines of the tire, numeral 7 a central land portion, and numeral 10 a circumferential shallow groove.

In the heavy duty pneumatic tire having the tread portion 1 shown in FIGS. 1a and 1b, a plurality of lug grooves 4a, 4b are arranged in the tread portion 1 so as to extend from each of the tread ends 2a, 2b toward the equator 3 of the tire, whereby the central land portion 7 is formed between the two circumferential lines 6a and 6b connecting terminal positions 5a, 5b of the lug grooves 4a, 4b substantially in the circumferential direction of the tire.

The term "substantially in the circumferential direction of the tire" for connecting the terminal positions 5a, 5b used herein includes a case that the terminal positions 5a or 5b are located in a region near to the same circumferential line 6a or 6b in addition to a case that the terminal positions 5a or 5b are located on the same circumferential line 6a or 6b.

As a main cause of generating heat in the tread portion of the tire, it is considered that a ground contacting part of the tread portion is subjected to not only compression deformation due to compression stress received from a road surface at a ground contact region during the running of the tire under loading but also bending deformation due to bending stress caused in the leading and trailing sides and these deformations are repeated to generate heat in the tread rubber.

Especially, the rubber gauge of the tread portion in the tire for construction vehicle is usually set to become relatively thick to a section height of the tire, so that the stiffness of the land portion in the tread portion is relatively high and the deformation amount based on the bending force is small. In such a construction vehicle tire, therefore, a greater part of heat generation in the tread portion is based on the repetition of the above compression deformation.

In the construction vehicle tire, it is the main current to adopt a lug pattern as a tread pattern. In the tire having such a lug pattern, a rubber volume of a central land portion located between terminal positions of the lug groove pair is large and hence heat is generated in the rubber by repeating the compression deformation and stored in the central land portion because heat can not rapidly be dissipated. As a result, temperature of rubber in the central land portion rises to a fairly high level during the running of the tire under loading and there may be caused separation failure of the tread portion through heat.

Moreover, the heat generation of the tread portion in the heavy duty pneumatic tire particularly comes into problem when the rubber gauge of the tread portion is relatively thick at a period ranging from a new tire to an initial use stage. Because, the tread portion is worn to render the rubber gauge into a certain thin gauge on and after the middle use stage of the tire, whereby there is removed a fear of raising the temperature of rubber in the tread portion up to an extent of causing separation failure through heat.

Now, the inventor has made studies in order to control the heat generation of the tread portion (particularly central land portion) causing the separation failure through heat in the tread portion at the period ranging from new tire to an initial use stage in the heavy duty pneumatic tire such as construction vehicle tire having the lug pattern or the like, and found out that compression stress applied to the central land portion in the ground contacting region is mitigated to effectively decrease the heat generation of the tread portion by using rubber having specified properties as a tread rubber and rationalizing lug grooves and shape of the central land portion.

According to the invention, the tread rubber has a loss tangent δ at room temperature (25° C.) of 0.04~0.40, and a negative ratio at a region corresponding to at least 50% of a tread width around the equator is 10~30%, and a maximum groove depth of the lug groove located at a zone corresponding to at least 80% of the tread width around the equator is not less than 60 mm, and a circumferential shallow groove extending along the circumferential direction of the tire is formed in the central land portion.

When the loss tangent δ at room temperature (25° C.) is less than 0.04 as the tread rubber, the breaking property of rubber is degraded, while when it exceeds 0.40, the heat build-up is degraded.

The reason why the negative ratio at a region 8 around the equator 3 corresponding to at least 50% of the tread width TW is 10~30% is due to the fact that when the negative ratio is less than 10%, the temperature of the central land portion becomes too high, while when it exceeds 30%, the wear resistance is degraded.

And also, the reason why the maximum value of groove depth D of the lug groove 4a, 4b located at a zone 9 around the equator 3 corresponding to at least 80% of the tread width TW is not less than 60 mm is due to the fact that when the maximum value of the groove depth D is less than 60 mm, there is no effect of reducing the heat generation because the lug groove becomes too shallow. Moreover, when the maximum value of the groove depth D is too large, there is a fear of degrading the wear resistance and the like, so that it is desirable that the upper limit of the maximum value is determined to an appropriate value in accordance with the kind of the tire.

Furthermore, when the circumferential shallow groove 10 extending along the circumferential direction of the tire is formed in the central land portion 7, compression stress applied to the central land portion 7 can be mitigated to effectively reduce the heat generation in the central land portion.

Moreover, it is desirable that the groove depth and groove width of the circumferential shallow groove 10 are set to an extent that the heat generation of the central land portion 7 can sufficiently be controlled at a period ranging from new tire to an initial use stage because the heat generation of the tread portion is remarkable at this period.

Concretely, the groove depth d of the circumferential shallow groove 10 is favorable to be not more than 25% of the above maximum value of the lug groove depth D. When the groove depth d is more than 25% of the maximum value of the lug groove depth D, the tread rubber volume is considerably decreased to cause a fear of degrading the wear resistance.

And also, the groove width GW of the circumferential shallow groove 10 is favorable to be within a range of 30~80% of a distance LW between the two circumferential lines 6a and 6b in the widthwise direction of the tire. When the groove width GW is less than 30% of the distance LW, there is a tendency that the effect of mitigating compression stress applied to the central land portion 7 can not sufficiently be developed during the running of the tire under loading, while when it exceeds 80% of the distance LW, the ground contact region of the central land portion 7 is too decreased to increase the ground contact pressure at a side region of the tread portion 1 and hence the trouble at the belt end is apt to be caused.

In the invention, the wear resistance is improved and the heat generation of the tread portion (particularly, central land portion) can effectively be controlled to prevent the occurrence of separation failure through heat during the running of the tire under loading by adopting the aforementioned constructions.

Moreover, when the invention is applied to heavy duty pneumatic tires having an aspect ratio of not more than 90%, particularly construction vehicle tires for wheeled crane or mobile crane, more preferably a construction vehicle tire wherein a coefficient in correspondence with a maximum speed in the Load/Inflation Pressure Table for construction vehicle tire defined in TRA is not less than 1.4, more remarkable effects can be developed.

Although only one embodiment of the invention has been described, it is apparent that many variations and modifications may be made without departing from the scope thereof.

The following example is given in illustration of the invention and is not intended as limitation thereof.

There is prepared a heavy duty pneumatic tire according to the invention and the performances thereof are evaluated as follows.

The tire to be tested is a pneumatic tire for construction vehicle having a tread portion shown in FIGS. 1a and 1b and a tire size of ORR37.00R57 (tread width TW: 830 mm), wherein a loss tangent δ of a tread rubber is 0.22, and a negative ratio in a region 8 is 15%, and a maximum value of groove depth D in lug grooves 4a, 4b located in a zone 9 is 85 mm, and a distance LW between two circumferential lines 6a and 6b is 180 mm, and a circumferential shallow groove 10 has a groove width GW of 100 mm and a groove depth d of 12 mm. This tire has the same structure as in the usually used pneumatic tire for use in the construction vehicle other than the above structure of the tread portion.

Figure 2A:
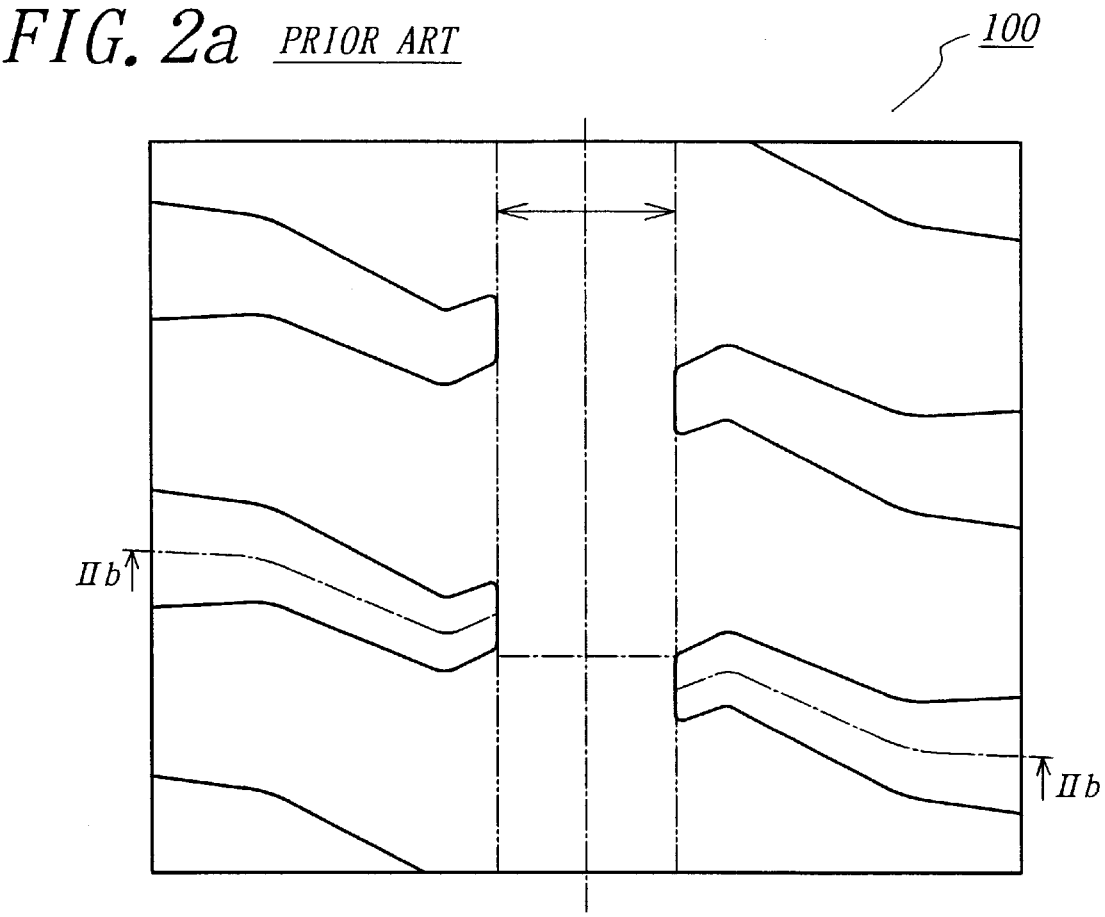
FIG. 2a is a diagrammatically developed view of an embodiment of the tread portion in the conventional heavy duty pneumatic tire.
Figure 2B:
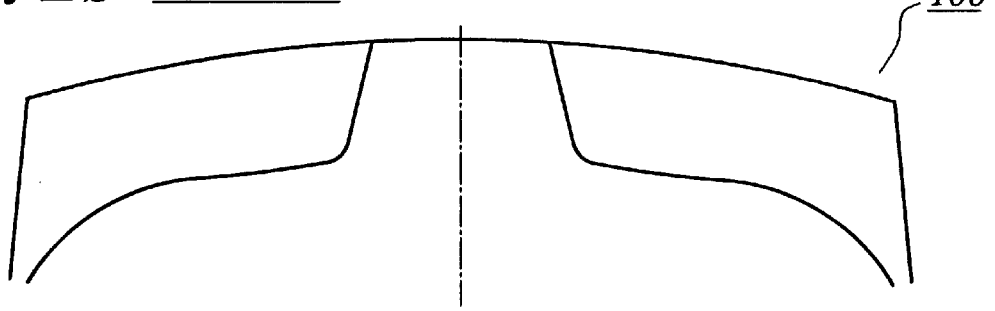

For the comparison, there is provided the conventional tire having a tread portion 100 shown in FIGS. 2a and 2b. This conventional tire has the same as in the above test tire except that the circumferential shallow groove is not formed in the central land portion and the loss tangent δ of the tread rubber is 0.20.

The wear resistance and heat build-up of the tread portion are evaluated with respect to these tires as follows.

The wear resistance of the tread portion is evaluated by mounting the tire onto a design rim defined in TRA and subjecting to a drum test for bad road under an air pressure of 7.0 kgf/cm$^2$ and a load of 51500 kgf. As a result, when an index of wear resistance in the conventional tire is 100, the index of wear resistance in the test tire is 99, from which it is apparent that the wear resistance of the test tire is superior to that of the conventional tire.

The heat build-up of the tread portion is evaluated by measuring a maximum temperature of the tread portion after the drum test is conducted under the same conditions for 24 hours. As a result, the temperature of rubber in the central land portion of the test tire is lower by about 5° C. than that of the conventional tire.

As mentioned above, according to the invention, there can be provided a heavy duty pneumatic tire for use in truck, bus, construction vehicle or the like having an excellent wear resistance and capable of effectively controlling heat generation of the tread portion (particularly, central land portion) during the running of the tire under loading to prevent the occurrence of separation failure through heat.

What is claimed is:

1. In a heavy duty pneumatic tire comprising; a tread portion, a plurality of lug grooves formed in the tread portion and extending from each end of the tread portion toward an equator of the tire, and a central land portion continuously extending between two circumferential lines each formed by connecting terminal positions of these lug grooves substantially in a circumferential direction of the tire, wherein a tread rubber constituting the tread portion has a loss tangent at room temperature of 0.04–0.40, and a negative ratio at a region corresponding to at least 50% of a tread width around the equator is 10–30%, and a maximum value of a groove depth of the lug groove located at a zone corresponding to at least 80% of the tread width around the equator is not less than 60 mm, and a circumferential shallow groove extending along the circumferential direction of the tire is formed in the central land portion, wherein said circumferential groove is shallow relative to said lug grooves and the circumferential shallow groove has a groove width corresponding to 30–80% of a distance between the two circumferential lines.

2. A heavy duty pneumatic tire according to claim 1, wherein the circumferential shallow groove has a groove depth corresponding to not more than 25% of the maximum value of the groove depth of the lug groove.

3. A heavy duty pneumatic tire according to claim 1, wherein the tire has an aspect ratio of not more than 90%.

4. A heavy duty pneumatic tire according to claim 1, wherein a coefficient in correspondence with a maximum speed in the Load/Inflation Pressure Table for construction vehicle tire defined in TRA is not less than 1.4.

* * * * *